Aug. 31, 1954     H. D. WHEELER     2,688,114
SPEED GOVERNOR FOR DIRECT CURRENT MOTORS
Filed March 7, 1950
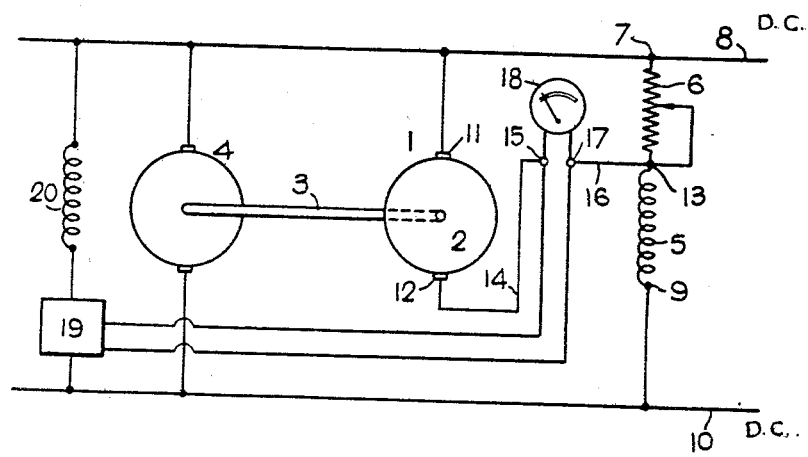
Inventor
Harold D. Wheeler.
By
Atty Patented Aug. 31, 1954

2,688,114

UNITED STATES PATENT OFFICE 2,688,114

SPEED GOVERNOR FOR DIRECT CURRENT MOTORS

Harold Dakin Wheeler, Norwich, England, assignor to Laurence, Scott & Electromotors Limited, Norwich, England, a company of Great Britain Application March 7, 1950, Serial No. 148,046

Claims priority, application Great Britain March 9, 1949

1 Claim. (Cl. 318—327)

This invention relates to means for signalling speed changes of a rotary machine, such means being adaptable also for governing the speed of such machine automatically.

The principal object of the invention is to provide an electrical apparatus embodying a dynamo-electric machine, which will afford a signal of a change in speed of a rotary machine, from a pre-set value in terms of, or dependent on, a voltage value, such signal being independent of variations in resistance, due to temperature changes of the field winding of the dynamo-electric machine, and also, within reasonable limits, independent of variations in the value of a reference voltage.

Another object of the invention is to enable such apparatus to be utilised as an electrical governor for maintaining automatically a constant pre-set speed of a rotary machine.

The means according to the present invention comprise a direct current dynamo-electric machine having a straight line or a practically straight line characteristic, mechanically driven from the rotary machine, the speed variation of which is to be signalled, or its speed automatically governed, said dynamo-electric machine having its field winding connected in series across a source of direct current supply, with a variable resistance which is not appreciably affected in value by temperature changes, one terminal of the armature of such dynamo-electric machine being electrically connected to the junction between the variable resistance and the supply and the other terminal of said armature being made available for enabling the armature voltage to be compared with the voltage at the junction between the variable resistance and the field winding of the dynamo-electric machine, so that by pre-setting the variable resistance to provide equality between the voltage developed by the armature and the voltage drop across the pre-set resistance at a selected speed of the rotary machine, any departure from such selected speed results in inequality between said voltages, the voltage difference then obtaining being utilised as a signal indicative of such departure from the selected speed, or being utilised to operate or control the operation of suitable means for restoring automatically the speed of the rotary machine to that selected.

One example of the means according to the invention is illustrated in the accompanying diagrammatic drawing.

In the example illustrated, a direct current dynamo-electric machine 1, hereinafter termed for convenience "the governor," has its armature mechanically driven by shaft 3 from an electric motor 4, the speed variation of which is to be signalled or the speed of which is to be governed automatically.

The governor has its field winding 5 connected in series with an adjustable resistance 6, the value of which is not appreciably affected by temperature changes.

This adjustable resistance may be composed of the material known as "Ferry," which is a composition of nickel and copper in the approximate proportions of 40% nickel and 60% copper, the specific resistance of such material being practically independent of temperature.

The field circuit of the governor comprising the series-connected field winding 5 and adjustable resistance 6, is excited from any convenient source of direct current supply indicated D. C., which need not necessarily be one of constant value, the outer end 7 of the resistance 6 being electrically connected to one of the D. C. supply lines 8 and the outer end 9 of the field winding 5 being electrically connected to the other D. C. supply line 10, so that said adjustable resistance 6 and field winding 5 are connected in series across the D. C. supply.

One terminal or pole 11 of the governor armature 2 is electrically connected to the supply line 8 to which the outer end 7 of the resistance 6 is connected.

The other terminal or pole 12 of the governor armature 2 is made available for enabling the armature voltage at that terminal to be compared with the voltage at the connecting junction 13 between the adjustable resistance 6 and the field winding 5.

For this purpose, the terminal 12 of the governor armature 2 is shown schematically as connected by a lead 14 to a terminal 15, while the junction 13 between the variable resistance 6 and the field winding 5 is shown connected by a lead 16 to a terminal 17, the terminals 15 and 17 providing for the connection of a voltmeter 18 for voltage measurement.

The governor is designed to have a straight line or practically straight line characteristic, so that at all values of field strength within the range determined by adjustment of the adjustable resistance 6, the field strength will be directly proportional to the value of the current flowing in the field winding.

Under these conditions for any pre-set value of the adjustable resistance 6, when no current is flowing in the governor armature 2, the voltage drop across the resistance 6 in circuit will be proportional to the value of the current flowing in the field winding 5.

The magnetic field strength of the magnetic system of the governor will also be proportional to the value of the current flowing in the field winding 5.

Therefore, at any particular speed the voltage developed across the armature terminals 11, 12 of the governor will also be proportional to the current flowing in the field winding 5, and at one particular speed, such voltage will be equal to the voltage drop across the adjustable resistance 6.

Thus, by appropriate pre-setting of the adjustable resistance 6, such equality of voltages can be made to occur at any selected speed within the range provided.

Having pre-set the adjustable resistance 6 to obtain this voltage equality at the selected speed, then any subsequent change of speed from that selected results in the armature voltage of the governor no longer being equal to the voltage drop across the resistance 6.

Such voltage difference is indicated on a suitable electrical measuring instrument such as a voltmeter 18 having its coil connected in series with the lines 14 and 16 whereby to afford a signal of the speed change. Alternatively or additionally such voltage difference is used to operate an electrically operable regulator unit of any known kind, diagrammatically shown at 19 for a field winding 20 of the motor 4 for restoring the speed of said motor to the selected value.

If the signal is afforded simply as an indicated voltage difference, no current then flowing in the armature 2 of the governor, a strict proportionality will obtain between the speed and voltage of the governor armature 2 for any given field current.

I claim:

Motor speed control apparatus comprising a motor connected to first and second supply conductors, a tachometer generator mechanically driven by said motor, said generator having an armature and a field winding, said field winding being connected across said supply conductors in series with a variable resistance, circuit means connected to said generator armature and to the junction point between said field winding and said resistance for deriving a voltage proportional to the difference between the generator armature voltage and the voltage across said resistance, said variable reistance being substantially unaffected by temperature variations, regulating means responsive to the voltage derived by said circuit means and operable to vary the speed of said motor.

References Cited in the file of this patent

UNITED STATES PATENTS

| Number | Name | Date |
|---|---|---|
| 1,231,666 | Stuart | July 3, 1917 |
| 1,520,973 | Staege | Dec. 30, 1920 |
| 1,926,668 | Riccia | Sept. 12, 1933 |
| 2,629,846 | Montgomery et al. | Feb. 24, 1953 |

FOREIGN PATENTS

| Number | Country | Date |
|---|---|---|
| 459,586 | Great Britain | Oct. 5, 1935 |